Oct. 17, 1939.  E. E. SMITH ET AL  2,176,772
SCAFFOLD SUPPORT FOR AUTOMOBILES
Filed June 15, 1938
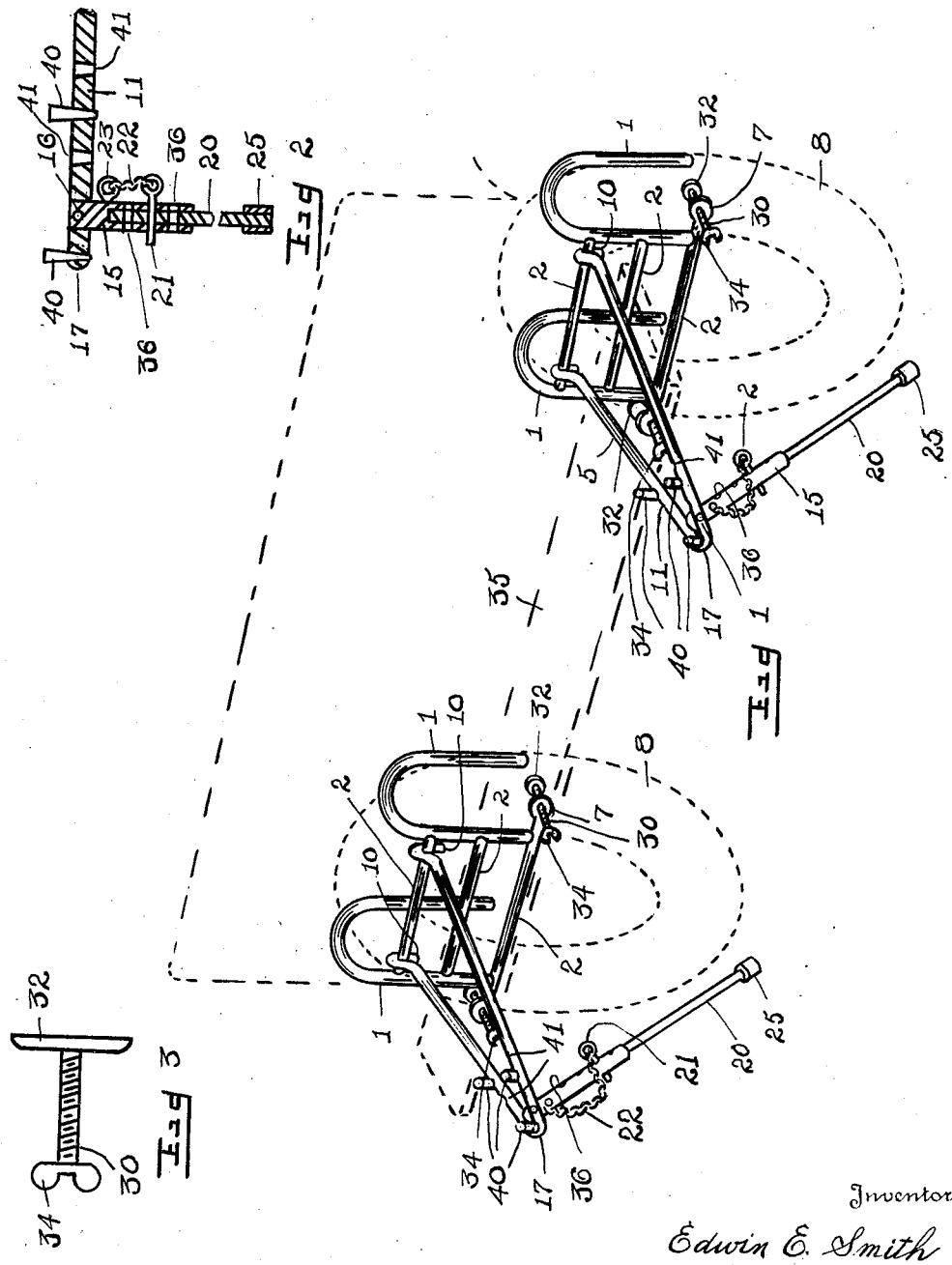
Inventors
Edwin E. Smith
Robert Rostedt
Thomas L. Wilder
By
Attorney Patented Oct. 17, 1939

2,176,772

UNITED STATES PATENT OFFICE 2,176,772

SCAFFOLD SUPPORT FOR AUTOMOBILES

Edwin Earl Smith and Robert Rostedt,
Utica, N. Y.

Application June 15, 1938, Serial No. 213,884

5 Claims. (Cl. 248—215)

Our invention relates to a scaffold support for automobiles and I declare the following to be a full, clear, concise and exact description thereof sufficient to enable anyone skilled in the art to which it appertains to make and use the same, reference being had to the accompanying drawing in which like reference characters refer to like parts throughout the specification.

The object of the invention is to provide a scaffold for use particularly with automobiles. The scaffold is designed to be applied to the two tires on the same side of an automobile to support a board, whereby the repair man can stand on said board and be within convenient reach of the top portion of the automobile.

The object will be understood by referring to the drawing in which,

Fig. 1 shows the scaffolding applied to the wheels of an automobile.

Fig. 2 is a detail enlarged view showing an adjustable standard in section and immediate parts.

Fig. 3 is a detail enlarged view showing a clamping member employed, parts being in section and parts in full.

Referring more particularly to the drawing the device embodies two U shaped members 1, 1 which are held in spaced relation to each other by cross bars 2, 2, 2 that are welded or otherwise secured to member 1, 1. The cross bars 2, 2, 2 are spaced from each other not only to strengthen the union of members 1, 1 but also to form vertical adjustments for the V shaped support member 5.

Furthermore, the lower bar 2 is extended at 7, 7 at each end beyond the U shaped member 1, 1, whereby to widen its gripping surface on the pneumatic tire 8.

A hook 10 is made on the free end of each of the horizontal portions 11 of support member 5. Hooks 10, 10 are adapted to engage one of the cross bars 2, 2, 2, whereby to support and anchor that portion of member 5 to said bar 2.

The adjustable sleeve member 15 is pivoted on shaft 16 carried in bearings made in portion 7, 7 near apex 17 of V shaped member 5. A rod 20 is telescoped to sleeve member 15 and held in adjusted position relative thereto by pin 21 which is fastened to a chain 22 to prevent its loss. The opposite end of chain 22 is secured to a headed pin 23 mounted in sleeve 15. The lower end of rod 20 has an enlarged part 25 which rests on the floor or ground near the tire 28 when the support is being used.

Retaining members comprising bolts 30 are screw mounted to the extended portions 7 of lower bars 2. Plates 32 are formed integral with the end of bolts 30, whereby to seat against the pneumatic tire 8 and winged nuts 34 are made integral with the opposite ends of bolts 30.

In operation the scaffold supports are used in pairs, one being attached to each of the pneumatic tires of the wheels on one side of the automobile and a board 35 laid across the horizontal portions 11, whereby to walk thereon and thereby reach the top part of the automobile.

In applying U shaped members 1 the finger pieces 34 of bolts 30 will be turned to engage pneumatic tire 8. The V shaped member 5 can be hooked on to any one of the cross bars 2 in accordance with the height of scaffolding desired. Furthermore, rod 20 can be adjusted to sleeve 15 by projecting pin 21 through the aligned apertures 36 of sleeve 15 and rod 20.

Pins 40, 40 are projected into one of the adjustable apertures 41 in each instance of horizontal portions 11 of member 5, whereby to prevent board 35 from sliding off said horizontal portions 11.

Having thus described our invention what we claim as new and desire to secure by Letters Patent is as follows:

1. In a scaffold support for automobiles, U shaped members for engaging a pneumatic tire, rods connecting said members, screw bolts mounted on one of said rods, a V shaped member removably engaging another one of said rods, a standard pivotally supported on said V shaped member, whereby to hold the same in horizontal position.

2. In a scaffold support for automobiles, U shaped members for spanning a pneumatic tire, rods connecting said U shaped members, a V shaped member removably attached on one of said rods, a sleeve pivotally mounted on said V shaped member, a standard pivotally mounted on said sleeve, whereby to hold said V shaped member in horizontal position.

3. In a scaffold support for automobiles, resilient U shaped members having free ends, adapted to engage a pneumatic tire, rods connecting said U shaped members, another member removably attached on one of said rods and a standard member pivotally supported on said last named member, whereby to hold said last named member in horizontal position.

4. In a scaffold support for automobiles, resilient U shaped members for engaging a pneumatic tire, bars connecting said resilient members, retaining members secured on one of said bars, whereby to hold said U shaped members on said pneumatic tire, a V shaped member removably attached on another one of said bars and a standard connected to said V shaped member, whereby to hold it in horizontal position.

5. In a scaffold support for automobiles, U shaped members having a given resiliency for engaging a pneumatic tire, members connecting said U shaped members, a platform support removably engaging one of said members, a sleeve pivotally attached on said support and a standard mounted on said sleeve, whereby to hold said support in horizontal position.

EDWIN EARL SMITH.
ROBERT ROSTEDT.